United States Patent
Tokuno et al.

(10) Patent No.: US 7,645,073 B2
(45) Date of Patent: Jan. 12, 2010

(54) HYDRODYNAMIC BEARING DEVICE, SPINDLE MOTOR AND DISC RECORDING AND REPRODUCING APPARATUS

(75) Inventors: Yasunori Tokuno, Saijyo (JP); Toshinori Takasuka, Ozu (JP); Taizo Ikegawa, Ozu (JP)

(73) Assignee: Panasonic Corporation, Osaka (JP)

( * ) Notice: Subject to any disclaimer, the term of this patent is extended or adjusted under 35 U.S.C. 154(b) by 777 days.

(21) Appl. No.: 11/236,830

(22) Filed: Sep. 28, 2005

(65) Prior Publication Data

US 2006/0067595 A1 Mar. 30, 2006

(30) Foreign Application Priority Data

Sep. 30, 2004 (JP) ............................. 2004-289067

(51) Int. Cl.
 *F16C 32/06* (2006.01)
(52) U.S. Cl. .................... 384/107; 384/100; 384/121; 360/98.07
(58) Field of Classification Search ................ 384/100, 384/107, 112, 113, 121, 123, 108, 110; 360/98.07, 360/99.08
See application file for complete search history.

(56) References Cited

U.S. PATENT DOCUMENTS

| 5,667,308 A | 9/1997 | Nose et al. |
| 6,059,459 A | 5/2000 | Ichiyama |
| 6,157,515 A * | 12/2000 | Boutaghou ............... 360/99.08 |
| 6,398,413 B1 * | 6/2002 | Inoue et al. .................. 384/112 |
| 6,583,952 B1 * | 6/2003 | Grantz et al. ............. 360/99.08 |

FOREIGN PATENT DOCUMENTS

| JP | 07-310739 | 11/1995 |
| JP | 2966725 | 8/1999 |

* cited by examiner

*Primary Examiner*—Thomas R Hannon
*Assistant Examiner*—Phillip Johnson
(74) *Attorney, Agent, or Firm*—Wenderoth, Lind & Ponack, L.L.P.

(57) ABSTRACT

A hydrodynamic bearing device which realizes power saving, reduction of a time period necessary for stabilizing rotation, and enhancement in durability to startup and halting of the motor at the same time by accelerating circulation of a lubricant in the vicinity of a flange with torque loss being kept low is provided. A flange (3) is fixed to one end of a shaft (2). On an inner surface of one of openings of a sleeve (1), a step portion (1C) is provided. When the shaft (2) is inserted into the sleeve (1), the flange (3) is in close vicinity to the step portion (1C). An inner diameter of the step portion (1C) is smaller in end portions in an axial direction than in a central portion. Thus, a gap between an outer surface (3C) of the flange (3) and a surface of the step portion (1C) which opposes the outer surface (3C) is narrow in the vicinity of boundaries of the outer surface (3C) of the flange (3) than in the vicinity the central portion.

6 Claims, 13 Drawing Sheets

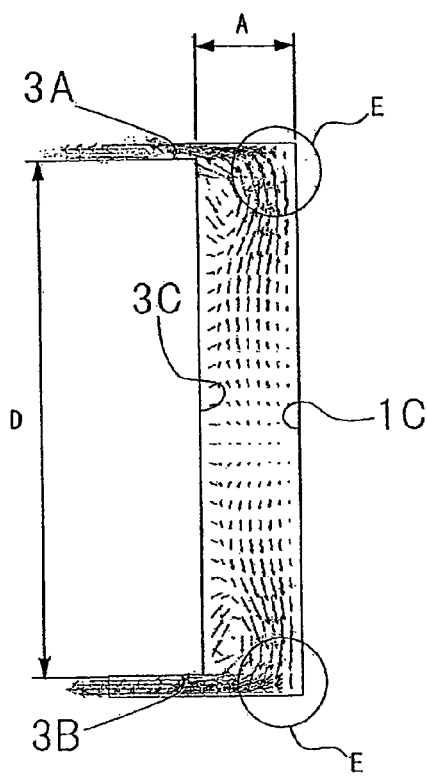
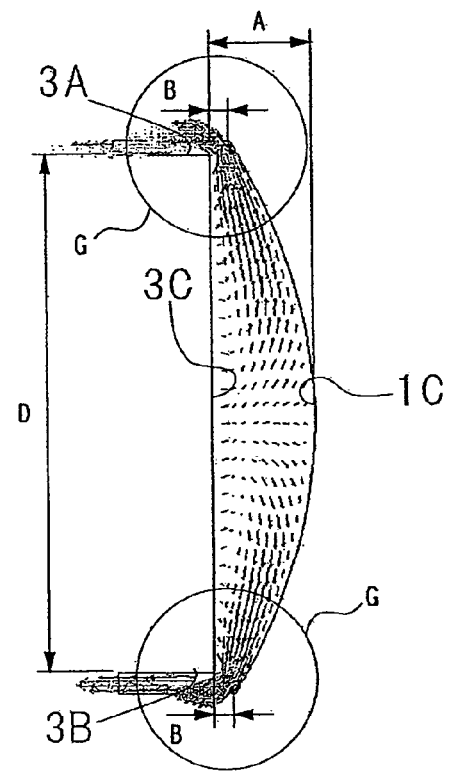
Fig. 7a          Fig. 7b
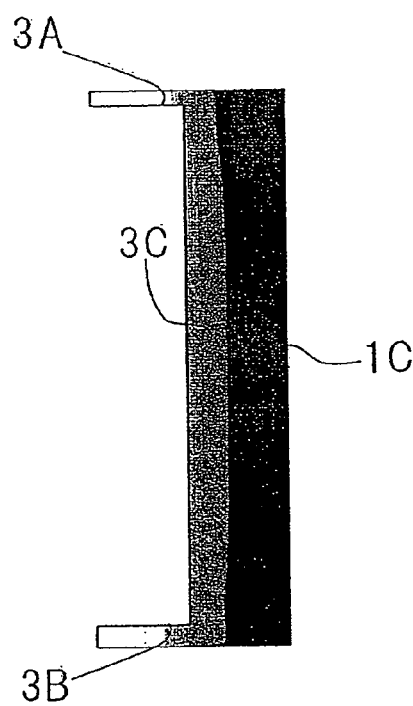
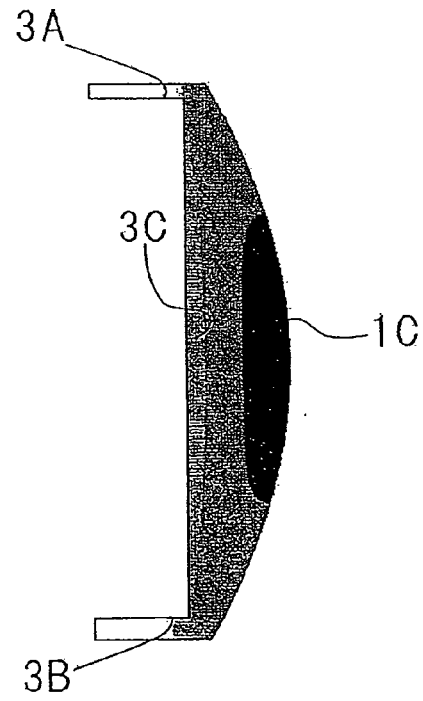
Fig. 7c          Fig. 7d

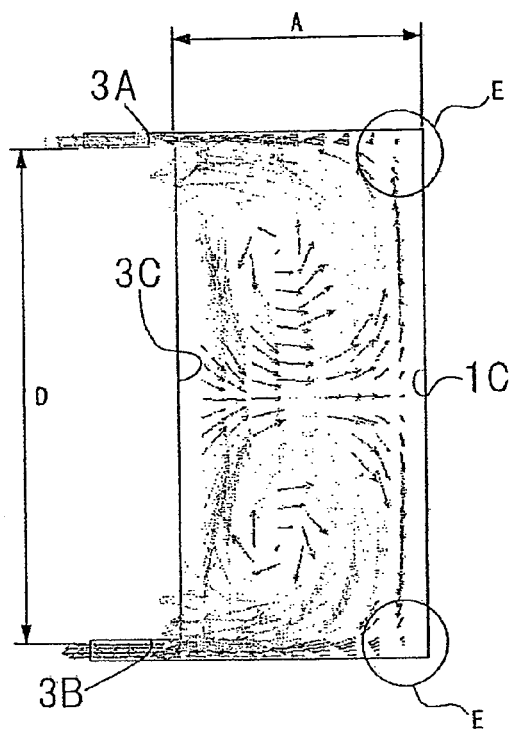
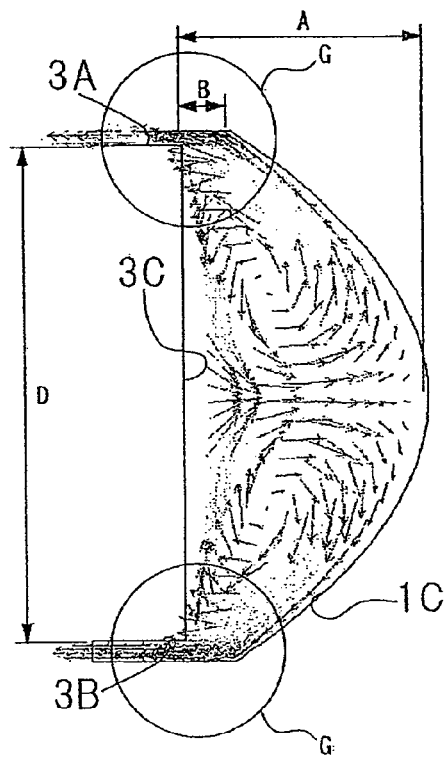
Fig. 9a　　　　　　　　Fig. 9b
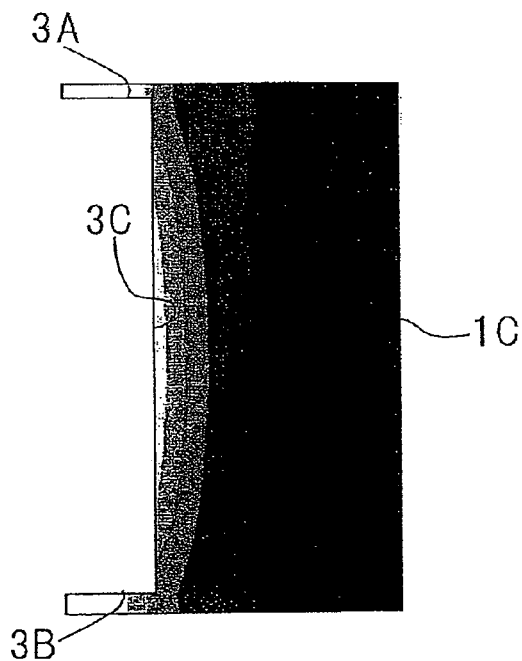
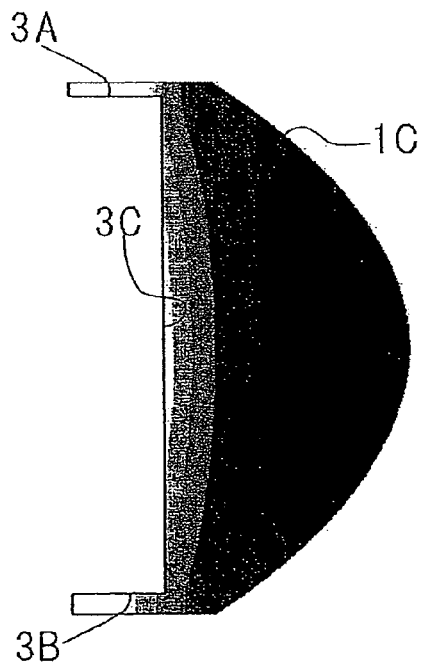
Fig. 9c　　　　　　　　Fig. 9d

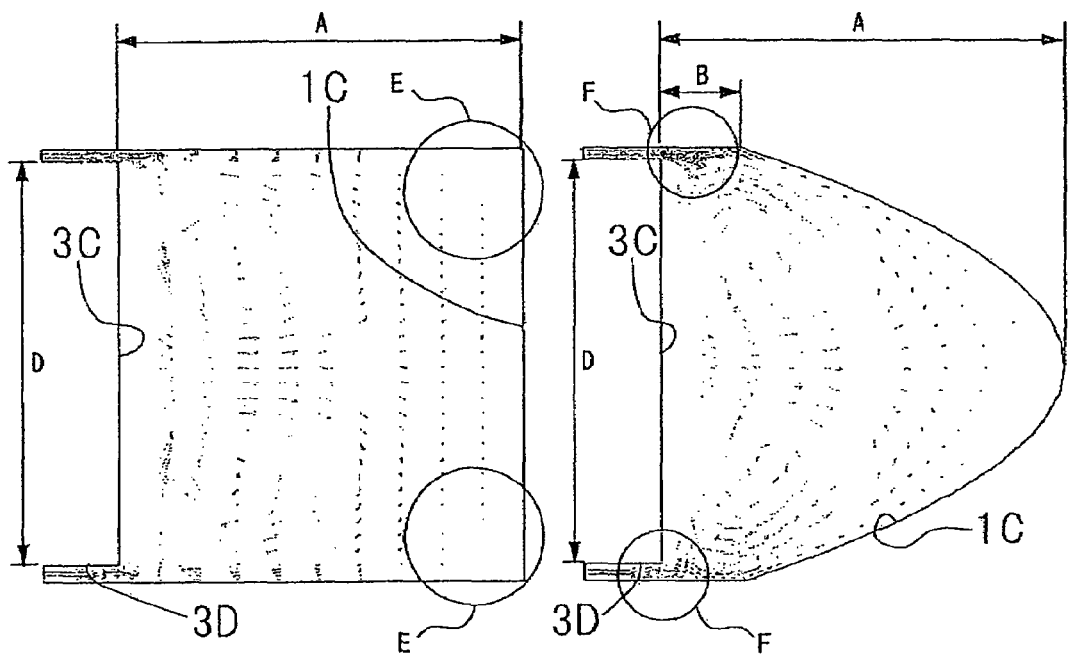
*Fig. 10a*  *Fig. 10b*
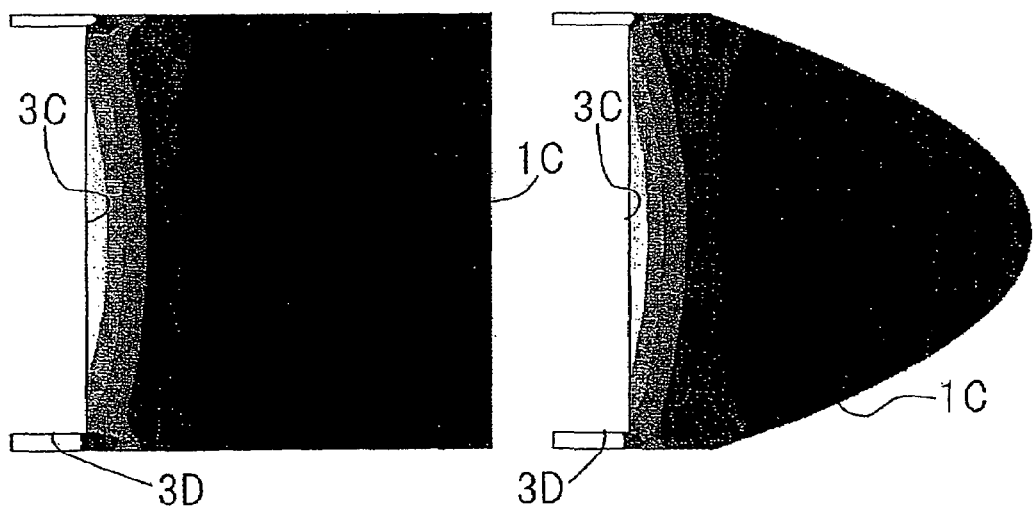
*Fig. 10c*  *Fig. 10d*

PRIOR ART

HYDRODYNAMIC BEARING DEVICE, SPINDLE MOTOR AND DISC RECORDING AND REPRODUCING APPARATUS

BACKGROUND OF THE INVENTION

1. Field of the Invention

The present invention relates to a hydrodynamic bearing device, a spindle motor using the same, and a disc recording and reproduction apparatus including the same.

2. Description of the Related Art

The disc recording and reproducing apparatus may be, for example, a hard disc drive (HDD), or a DVD recorder, which magnetically or optically reads/writes data from/to a disc type recording medium such as a magnetic disc or an optical disc (hereinafter, referred to as a disc) while rotating the disc.

Disc recording and reproducing apparatuses are required to have more capacity and a higher speed of data transfer. Particularly, more HDDs are used in AV equipment and mobile equipment in recent years. For use in such equipment, a high durability is also required in addition to the above requirements. Therefore, it is desired that rotation of the discs becomes more rapid and more stable with a high precision. Furthermore, the reliability on such a rotation has to be maintained high for a long period of time.

Hydrodynamic bearing devices are suitable for such rotary drive systems having a high speed, high precision and high durability.

FIG. 12 is a cross sectional view showing an example of a conventional hydrodynamic bearing device. The hydrodynamic bearing device is mounted on an HDD.

An outer surface of a sleeve 31 is fixed to a base 35. Into the sleeve 31, a shaft 32 is inserted so as to be rotatable around its central axis. An upper end of the shaft 32 is fixed to a central portion of a hub 36 by, for example, press fitting. A flange 33 is fixed to a lower end of the shaft 32 in close vicinity to a step portion 31C provided in a lower opening of the sleeve 31. The lower opening of the sleeve 31 is sealed with a thrust plate 34.

On an inner surface of the sleeve 31, radial dynamic pressure generating grooves 31A and 31B are provided (see portions indicated by broken lines in FIG. 12). On an upper surface and a lower surface of the flange 33, thrust dynamic pressure generating grooves 33A and 33B are provided. The radial dynamic pressure generating grooves 31A and 31B and the thrust dynamic pressure generating grooves 33A and 33B may be, for example, grooves having a herringbone pattern. Oil 42 fills most of gaps between the sleeve 31, the shaft 32, the flange 33 and the thrust plate 34. Particularly, the oil 42 covers the entire surface of the radial dynamic pressure generating grooves 31A and 31B and the thrust dynamic pressure generating grooves 33A and 33B.

To an outer surface of the hub 36, magnetic discs 39 can be fixed coaxially with the shaft 32. In general, a plurality of magnetic discs 39 may be attached. A spacer 40 is provided between inner peripheral portions of the magnetic discs 39. A clamper 41 is fixed to an upper portion of the hub 36 with, for example, a screw 43 to press the inner peripheral portions of the magnetic discs 39 downward. In this way, the magnetic discs 39 are fixed to the hub 36.

On an inner surface of the hub 36, a magnet 38 is provided. Opposite to the magnet 38, a stator 37 is provided on the base 35. The stator 37 and the magnet 38 form a driving force generating section for disc rotation.

The above-described hydrodynamic bearing device operates as follows.

When a current flows through the stator 37, a magnetic field is generated in a core portion of the stator 37. The magnetic field generated between the stator 37 and the magnet 38 applies a rotational force to the hub 36. Thus, the shaft 32, the hub 36, and the magnetic discs 39 integrally rotate having the shaft 32 as an axis.

As they rotate, the oil 42 flows along the radial dynamic pressure generating grooves 31A and 31B and gathers in the vicinity of inflection points of the dynamic pressure generating grooves. As a result, the pressure of the oil 42 is raised in a gap near the central portions. This high pressure due to a pumping action maintains a gap between the sleeve 31 and the shaft 32 stable. Thus, a rotational axis of each of the magnetic discs 39 does not substantially move in a radial direction of the sleeve 31.

Similarly, the oil 42 flows along the thrust dynamic pressure generating grooves 33A and 33B and gather to their central portions. As a result, pressure of the oil 42 is raised in gaps above and below the flange 33. This high pressure due to a pumping action maintains a gap between an upper surface of the flange 33 and the sleeve 31, and a gap between a lower surface of the flange 33 and the thrust plate 34 stable. Thus, a rotational axis of each of the magnetic discs 39 does not substantially tilt from an axial direction of the sleeve 31. Furthermore, the shaft 32 is not substantially displaced in the axial direction.

In this way, the above-described hydrodynamic bearing device rotates the magnetic discs 39 rapidly with a high precision and a stable manner.

In the above-described hydrodynamic bearing device, a gap between an outer peripheral surface 33C of the flange 33 and a surface of the step portion 31C of the sleeve 31 is uniform across the entirety of the outer peripheral surface 33C, and is sufficiently large compared to the space between the upper surface of the flange 33 and the sleeve 31, and the gap between the lower surface of the flange 33 and the thrust plate 34. Thus, friction due to the oil 42 on the outer peripheral surface 33C of the flange 33 is small. Accordingly, so-called torque loss is small. This leads to high rotation efficiency of the magnetic discs 39 and low power consumption.

Another type of conventional hydrodynamic bearing device is also known (see for example, Japanese Patent Gazette No. 2966725). Unlike the above-described hydrodynamic bearing device, the gap between the outer surface of the flange and the inner surface of the sleeve varies in the axial direction as shown in FIG. 13. In this type of hydrodynamic bearing device, a protrusion 33D is provided on the outer peripheral surface 33C of the flange 33. Thus, the gap between the outer peripheral surface 33C and a surface of the step portion 31C of the sleeve 31 is narrow in the vicinity of the tip of the protrusion 33D compared to that in gaps U and D above and below the tip.

In general, a sealing force of the oil 42 becomes strong as a width of the space to be filled becomes small. Thus, the sealing force of the oil 42 is stronger in the gap near the tip of the protrusion 33D than in the gaps U and D above and below the tip. Therefore, it is difficult for the oil 42 to move beyond the protrusion 33D. This means that the oil 42 cannot easily circulate from above the flange 33 to below the flange 33, and vice versa.

When the shaft 32 is tilted from the axial direction of the sleeve 31 or displaced in the axial direction, both the gap between the upper surface of the flange 33 and the sleeve 31, and the gap between the lower surface of the flange 33 and the thrust plate 34 change. This causes a gap in the pressure of the oil 42 above and below the flange 33. However, since the oil 42 cannot easily move beyond the protrusion 33D, the pressure gap cannot be eased by circulation of the oil 42. The pressure gap brings back the shaft 32 to its original position.

In this way, an excessive tilt and an excessive displacement in the axial direction of the shaft 32 can be both prevented effectively.

In some of the conventional hydrodynamic bearing devices, flanges are provided to shafts as described above. An outer peripheral surface of the flange has a distance from the central axis of the shaft (i.e., diameter) larger those of a side surface of the shaft and other surfaces of the flange. Thus, a large portion of torque loss is due to friction between the outer peripheral surface of the flange and a lubricant. Therefore, it is effective to keep the friction due to a lubricant on the outer peripheral surface of the flange low for keeping the total torque loss low. Keeping the torque loss low is preferable because it results in keeping the rotation efficiency of discs high and accelerating power saving.

In the conventional hydrodynamic bearing devices as shown in FIG. 13, the stability of the shaft is improved as described above. However, the torque loss increases. Thus, it is not preferable in view of power saving.

Furthermore, since the lubricant cannot be easily circulate around the flange, circulation of the lubricant along the thrust dynamic pressure generating grooves is not accelerated. Thus, it is difficult to reduce a period of time for the pressure of the lubricant to be raised sufficiently in the gaps above and below the flange after the flange started to rotate. Specifically, it is difficult to reduce a period of time necessary for achieving stable rotation of the discs after startup of the spindle motor. Particularly, in HDDs, it is difficult to further speed up the startup from a halting state or standby state.

An object of the present invention is to provide a hydrodynamic bearing device which accelerates circulation of a lubricant in the vicinity of a flange while keeping a torque loss low, thereby achieving both power saving and reduction of a period of time necessary for stabilizing rotation and improving a durability of the motor in startup and halting.

SUMMARY OF THE INVENTION

According to one aspect of the present invention, there is provided a hydrodynamic bearing device comprising a shaft; a flange which has a shape which is substantially disc shape and is fixed to one end of the shaft; a sleeve having the shaft and the flange inserted into a space defined by an inner surface with a predeterminate gap being placed between the shaft and the flange and the inner surface, the sleeve having an inner surface portion which opposes an outer peripheral surface of the flange which has an inner diameter smaller in end portions in an axial direction than in a central portion; a thrust plate which closes an opening end of the sleeve and which is in close vicinity to the flange; and a lubricant filled in a gap between the shaft and the sleeve, a gap between the flange and the sleeve; and a gap between the flange and the thrust plate.

According to another aspect of the present invention, there is provided a spindle motor comprising: a hydrodynamic bearing device including a shaft, a flange which has a shape which is substantially disc shape and is fixed to one end of the shaft, a sleeve having the shaft and the flange inserted into a space defined by an inner surface with a predeterminate gap being placed between the shaft and the flange and the inner surface, the sleeve having an inner surface portion which opposes an outer peripheral surface of the flange which has an inner diameter smaller in end portions in an axial direction than in a central portion, a thrust plate which closes an opening end of the sleeve and which is in close vicinity to the flange, and a lubricant filled in a gap between the shaft and the sleeve, a gap between the flange and the sleeve; and a gap between the flange and the thrust plate; a hub which is coaxially integral with one of the shaft and the sleeve; a base for fixing the other of the shaft and the sleeve; a magnet provided on the hub; and a stator provided on the base so as to oppose the magnet.

According to one aspect of the present invention, there is provided a disc recording and reproducing apparatus comprising a hydrodynamic bearing device including a shaft, a flange which has a shape which is substantially disc shape and is fixed to one end of the shaft, a sleeve having the shaft and the flange inserted into a space defined by an inner surface with a predeterminate gap being placed between the shaft and the flange and the inner surface, the sleeve having an inner surface portion which opposes an outer peripheral surface of the flange which has an inner diameter smaller in end portions in an axial direction than in a central portion, a thrust plate which closes an opening end of the sleeve and which is in close vicinity to the flange, and a lubricant filled in a gap between the shaft and the sleeve, a gap between the flange and the sleeve; and a gap between the flange and the thrust plate; a hub which is coaxially integral with one of the shaft and the sleeve; a base for fixing the other of the shaft and the sleeve; a magnet provided on the hub; and a stator provided on the base so as to oppose the magnet; a disc type recording medium provided coaxially with the hub; and a head for recording a signal to the disc type recording medium and reproducing a signal from the disc type recording medium when a magnetic field generated between the magnet and the stator applies a rotational force to the hub and the disc type recording medium to rotate.

In the above-described hydrodynamic bearing device according to the present invention, pressure of the lubricant filled between the gap between the shaft and the sleeve, the gap between the flange and the sleeve, and the gap between the flange and the thrust plate maintains the rotational axis stable while one of the shaft and the sleeve is rotating around the other. Particularly, pressure of the lubricant filled in the gaps above and below the flange prevents the shaft from substantially tilting from the axial direction of the sleeve and substantially displacing in the axial direction. In this way, the above-described hydrodynamic bearing device according to the present invention rotates the shaft or the sleeve rapidly with a high precision and in a stable manner.

In general, when the shaft or the sleeve rotates, the lubricant filled in the gap in the vicinity of the outer peripheral surface of the flange has a main flow along the rotational direction of the shaft or the sleeve, and also has a secondary flow orthogonal to the main flow. On a plane which includes the rotational axis of the shaft or the sleeve and which rotates with the shaft or the sleeve, such a secondary flow is two eddies. In the vicinity of the outer peripheral surface of the flange, the eddies respectively flow from upper and lower boundaries of the outer peripheral surface toward its center. The eddies bump into each other in the vicinity of the center of the outer peripheral surface of the flange and they together flow away from the outer peripheral surface. The flow moved away from the outer peripheral surface of the flange is separated in upward and downward directions in the vicinity of the inner surface of the sleeve which opposes the outer peripheral surface and the flows respectively return to the vicinity of the upper and lower boundaries of the flange.

In the above-described hydrodynamic bearing device according to the present invention, an inner diameter of the inner surface portion of the sleeve which opposes the outer peripheral surface of the flange is smaller in end portions in the axial direction than in the central portion. Thus, the gap between the outer peripheral surface of the flange and the inner peripheral portion of the sleeve which opposes the outer peripheral surface is narrow in the vicinity of boundaries of the outer peripheral surface compared to that in the vicinity of the center. Preferably, the inner surface portion of the sleeve which opposes the outer peripheral surface of the flange forms a true circular arc or elliptic circular arc along the axial direction. Alternatively, the inner surface portion may include a plane inclined with respect to the axial direction. The inclined plane may be a flat plane or a curved plane.

Thus, the inner surface portion of the sleeve which opposes the outer peripheral surface of the flange keeps a large distance to the outer peripheral surface in the vicinity of its center and approaches the outer peripheral surface as it proceeds upward or downward from the center.

In the above-described hydrodynamic bearing device according to the present invention, a distance between the outer peripheral surface of the flange and the inner surface of the sleeve is kept large across the entirety of the outer peripheral surface. Thus, torque loss can be kept low.

On the other hand, the above-described secondary flow, i.e., eddy changes its direction smoothly along the inner surface of the sleeve in the vicinity of the inner surface. Therefore, in the eddy, a flow rate is kept high in the range covering the vicinity of the inner surface of the sleeve and the vicinity of upper and lower boundaries of the outer peripheral surface of the flange. As a result, the lubricant is efficiently pumped from the gap near the outer peripheral surface of the flange to the gaps above and below the flange.

Particularly, when a thrust dynamic pressure generating groove is provided on at least one of a circular surface of the flange, the inner surface of the sleeve which opposes the circular surface, and a surface of the thrust plate, circulation along the thrust dynamic pressure generating groove is rapid. Therefore, a period of time necessary for the pressure of the lubricant to be raised sufficiently in the gaps above and below the flange after the flange or the sleeve started to rotate is short.

As described above, the hydrodynamic bearing device according to the present invention has low torque loss and a short period of time necessary for the pressure of the lubricant to be raised sufficiently in the gaps above and below the flange after the flange or the sleeve started to rotate.

Thus, when such a hydrodynamic bearing device is used for a spindle motor, a period of time necessary for the spindle motor to stabilize the rotation after it is started is short. Moreover, when such a spindle motor is mounted on the disc recording and reproducing apparatus, a rotation efficiency of the disc is further improved in the disc recording and reproducing apparatus and startup from the halting state or standby state can be further speeded up. In addition, the durability further improves, realizing further extension of the life.

BRIEF DESCRIPTION OF THE DRAWINGS

FIGS. 6A and 6C show the case where the surface of the step portion 1C is a flat plane, and FIGS. 6B and 6D show the case where the surface is an ellipsoidal plane according to the present invention.

FIGS. 7A through 7D are diagrams showing flow rate/pressure distributions of the lubricant in the vicinity of thrust dynamic pressure generating grooves 3A and 3B at the outermost peripheral portion of the flange in the gap between the outer peripheral surface 3C of the flange and the step portion 1C of the sleeve (aspect ratio A/D=0.2). FIGS. 7A and 7C show the case where the surface of the step portion 1C is a flat plane, and FIGS. 7B and 7D show the case where the surface is an ellipsoidal plane according to the present invention.

FIGS. 8A and 8C show the case where the surface of the step portion 1C is a flat plane, and FIGS. 8B and 8D show the case where the surface is an ellipsoidal plane according to the present invention.

FIGS. 9A through 9D are diagrams showing flow rate/pressure distributions of the lubricant in the vicinity of the thrust dynamic pressure generating grooves 3A and 3B at the outermost peripheral portion of the flange in the gap between the outer peripheral surface 3C of the flange and the step portion 1C of the sleeve (aspect ratio A/D=0.5). FIGS. 9A and 9C show the case where the surface of the step portion 1C is a flat plane, and FIGS. 9B and 9D show the case where the surface is an ellipsoidal plane according to the present invention.

FIGS. 10A through 10D are diagrams showing flow rate/pressure distributions of the lubricant in the vicinity of the land 3D at the outermost peripheral portion of the flange in the gap between the outer peripheral surface 3C of the flange and the step portion 1C of the sleeve (aspect ratio A/D=1). FIGS. 10A and 10C show the case where the surface of the step portion 1C is a flat plane, and FIGS. 10B and 10D show the case where the surface is an ellipsoidal plane according to the present invention.

FIGS. 11A and 11C show the case where the surface of the step portion 1C is a flat plane, and FIGS. 11B and 11D show the case where the surface is an ellipsoidal plane according to the present invention.

DESCRIPTION OF THE PREFERRED EMBODIMENTS

Hereinafter, preferred embodiments of the present invention will be described with reference to the drawings.

Figure 1:
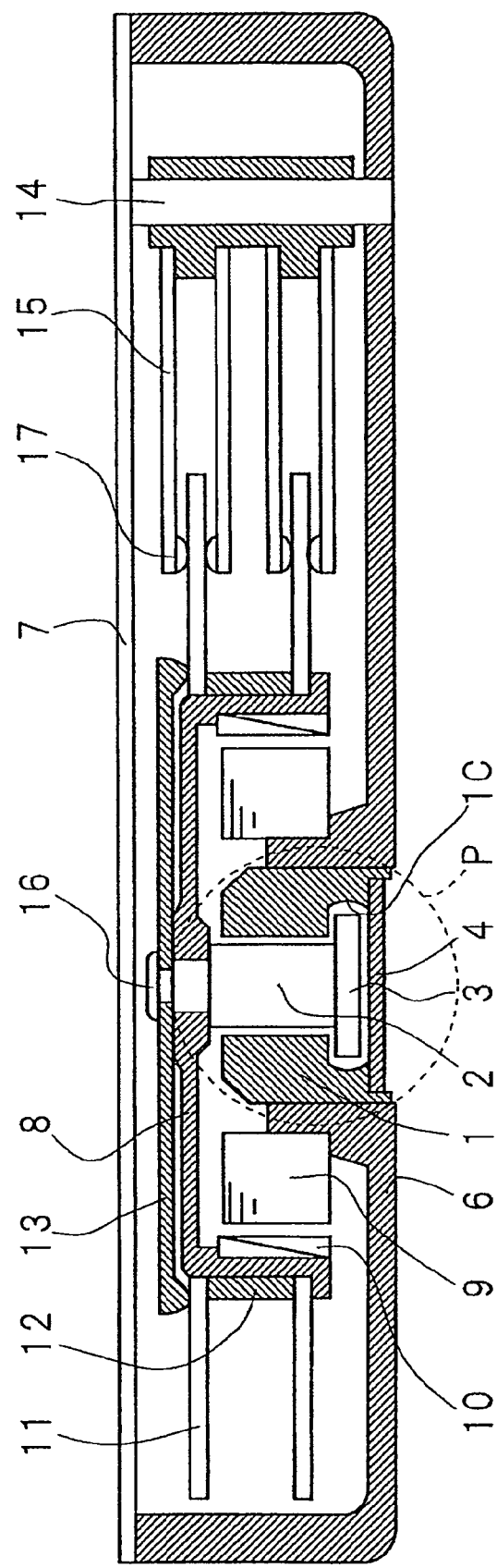
FIG. 1 is a cross-sectional view of an HDD according to an embodiment of the present invention.

FIG. 1 is a cross-sectional view of an HDD, which is a disc recording and reproducing apparatus according to an embodiment of the present invention.

The HDD includes a base 6, an upper lid 7, a spindle motor, magnetic disc(s) 11, a spacer 12, a clamper 13, a support 14, and rotation arms 15.

The spindle motor includes a hydrodynamic bearing device, a hub 8, a stator 9, and a magnet 10.

The hydrodynamic bearing device includes a sleeve 1, a shaft 2, a flange 3, and a thrust plate 4 (see circle P indicated by broken lines in FIG. 1).

The base 6 and the upper lid 7 are fitted to each other and form a housing of a box shape. The base 6 and the upper lid 7 seal the housing so that foreign materials such as dirt from outside can be prevented from entering.

The sleeve 1 is inserted into a hole of the base 6, and is fixed.

The shaft 2 is inserted into the sleeve 1 from its upper opening end. The shaft 2 is rotatable around its central axis. The upper end of the shaft 2 is press fitted to the hub 8 and is fixed. In this way, the hub 8 rotates around the sleeve 1 having the shaft 2 as its axis. Alternatively, the shaft 2 may be fixed to the base 6, and the sleeve 1 may be fixed to the hub 8. In this case, the hub 8 rotates with the sleeve 1 having the shaft 2 as its axis.

The flange 3 is a ring preferably made of metal. Inside the flange 3, a lower end of the shaft 2 is inserted. The flange 3 is fixed to the lower end of the shaft 2 in such a state.

A step portion 1C is provided in a lower opening on an inner surface of the sleeve 1. When the shaft 2 is inserted into the sleeve 1, the flange 3 is in close vicinity to the step portion 1C of the sleeve 1.

The thrust plate 4 seals the lower opening end of the sleeve 1. The thrust plate 4 is fixed to the lower opening end of the sleeve 1 by laser welding, precision swaging, adhering, or the like. Alternatively, the thrust plate 4 may be fixed to the base 6.

On an outer surface of the hub 8, the magnetic disc(s) 11 is fixed coaxially with the shaft 2. Preferably, a plurality of magnetic discs 11 are attached. Alternatively, one magnetic disc 11 may be used.

Between inner peripheral portions of two magnetic discs 11 adjacent to each other in a vertical direction, the spacer 12 is provided in inner peripheral portions. Further, a clamper 13 is fixed to an upper portion of the hub 8 by, for example, a screw 16 to press the inner peripheral portions of the magnetic disc(s) 11 downward. In this way, the magnetic disc(s) 11 is fixed to the hub 8.

The stator 9 is fixed to the base 6 around the sleeve 1. The magnet 10 is provided on an inner surface of the hub 8 so as to oppose the stator 9. The stator 9 and the magnet 10 form a driving force generating section for disc rotation.

A lower end of the support 14 is fixed to the base 6. Each of the rotation arms 15 has a head 17 in its tip portion and is connected to the support 14 at its back end so as to be rotatable. One rotation arm 15 is provided for each of a surface of the magnetic disc(s) 11.

Figure 2:
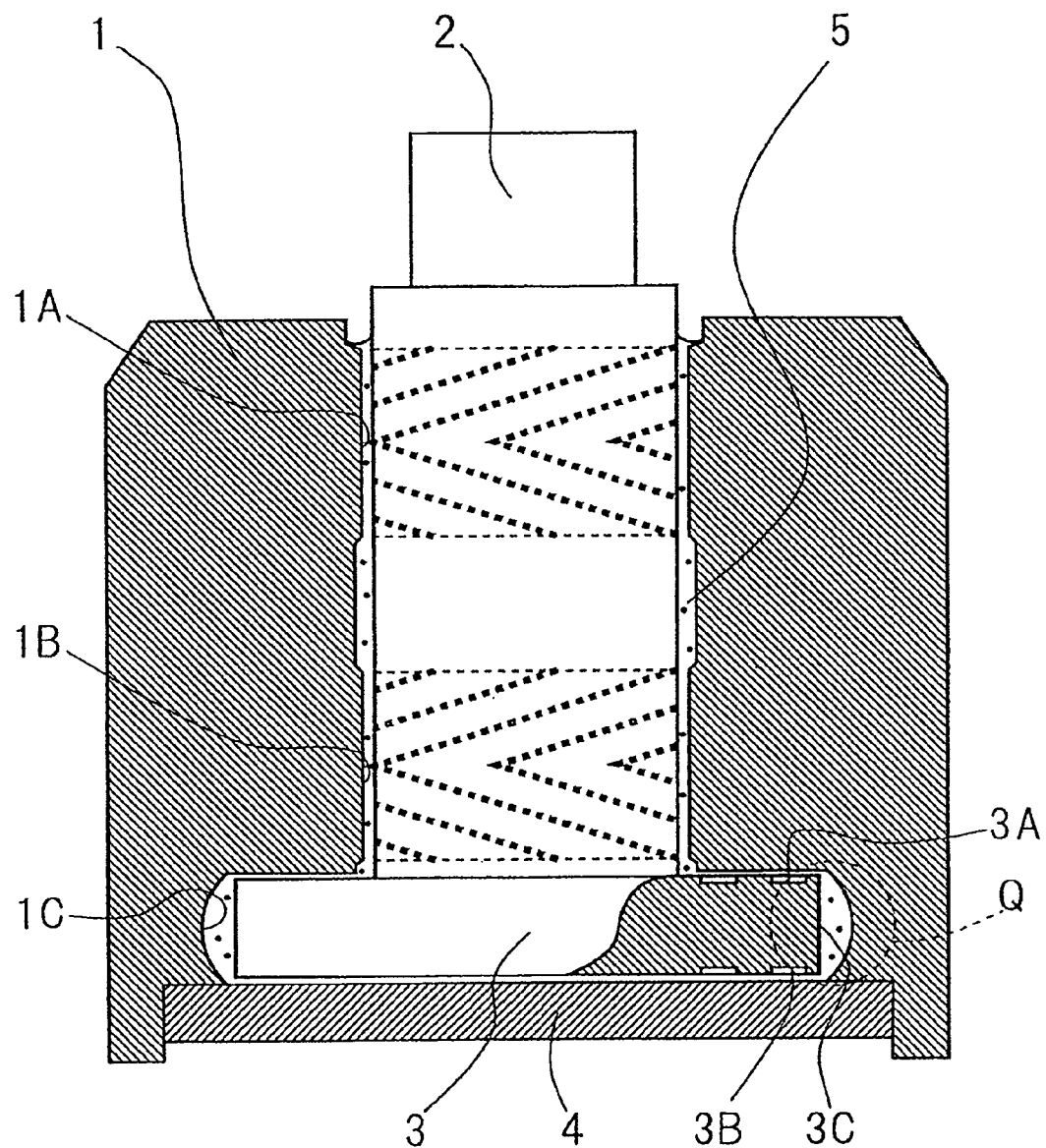
FIG. 2 is an enlarged view of circle P indicated in FIG. 1 and is a cross sectional view showing a hydrodynamic bearing device according to an embodiment of the present invention.

FIG. 2 is an enlarged view of circle P indicated by broken lines in FIG. 1, and is a cross-sectional view of the above-described hydrodynamic bearing device.

In gaps between the sleeve 1, the shaft 2, the flange 3, and the thrust plate 4, a lubricant 5 is filled. Preferably, the lubricant 5 is oil.

Preferably, radial dynamic pressure generating grooves 1A and 1B are provided in an upper portion and a lower portion on an inner surface of the sleeve 1 (see broken lines shown in FIG. 2). Instead of or in addition to the inner surface of the sleeve 1, a radial dynamic pressure generating groove may be provided on a side surface of the shaft 2.

Preferably, the radial dynamic pressure generating grooves 1A and 1B are grooves having a herringbone pattern (see broken lines shown in FIG. 2). Alternatively, they may have a spiral pattern.

Thrust dynamic pressure generating grooves 3A and 3B may be provided preferably on both an upper surface and lower surface of the flange 3. Alternatively, a thrust dynamic pressure generating groove may be provided on either of upper and lower surfaces of the flange 3. Furthermore, instead of or in addition to the upper and lower surfaces of the flange 3, a thrust dynamic pressure generating groove may be provided on either or both of a surface of the step portion 1C of the sleeve 1 and an upper surface of the thrust plate 4.

Figure 3:
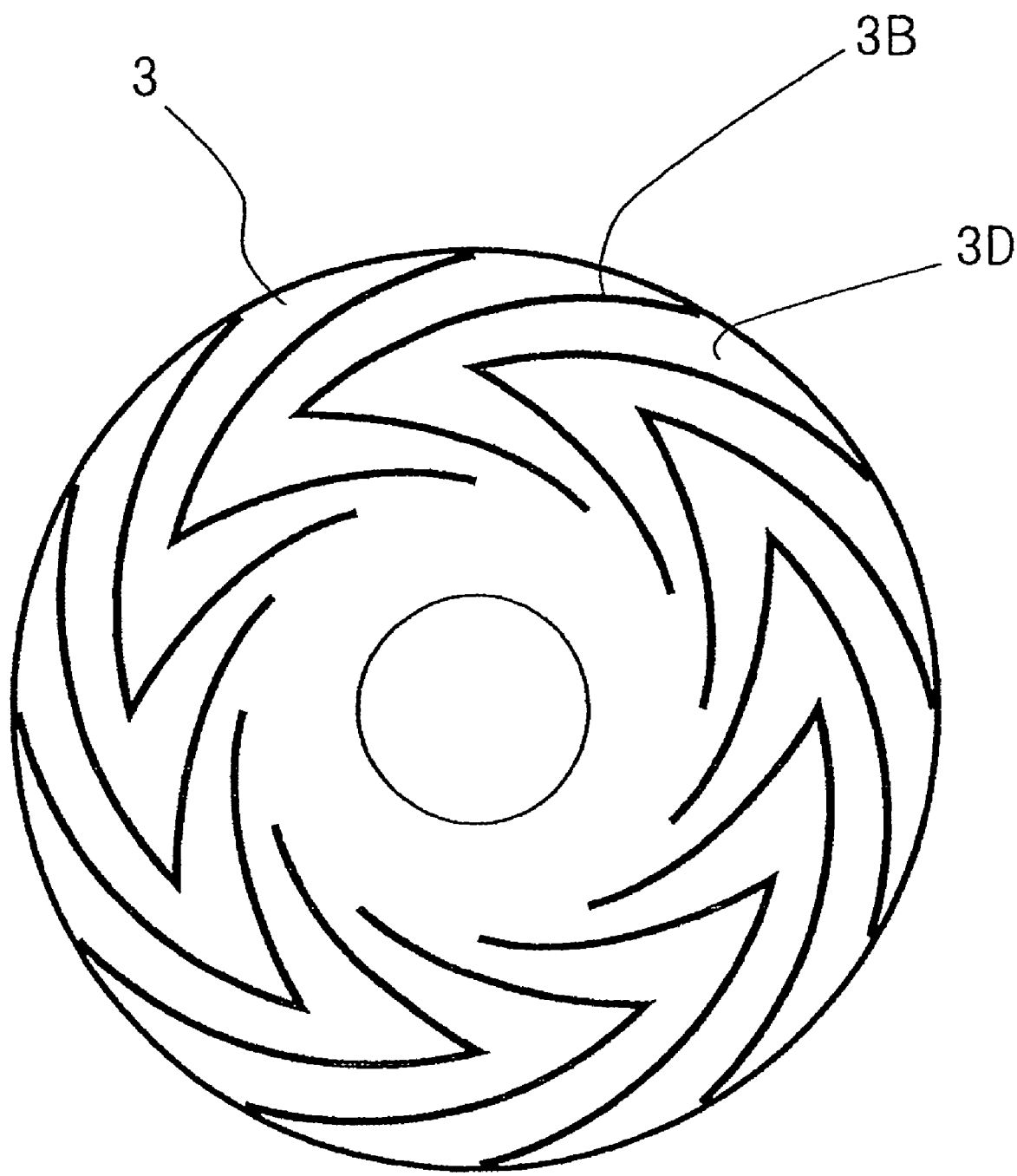
FIG. 3 is a bottom view of a flange 3 included in a hydrodynamic bearing device according to an embodiment of the present invention.

Preferably, the thrust dynamic pressure generating grooves 3A and 3B are grooves having a herringbone pattern (see FIG. 3). Alternatively, they may have a spiral pattern.

The inner diameter of the step portion 1C of the sleeve 1 in ends is smaller than that in the central portion. Thus, a gap between an outer peripheral surface 3C of the flange 3 and a surface of the step portion 1C is narrow in the vicinity of boundaries of the outer peripheral surface 3C of the flange 3 than it is in the vicinity of its center.

Figure 4A:
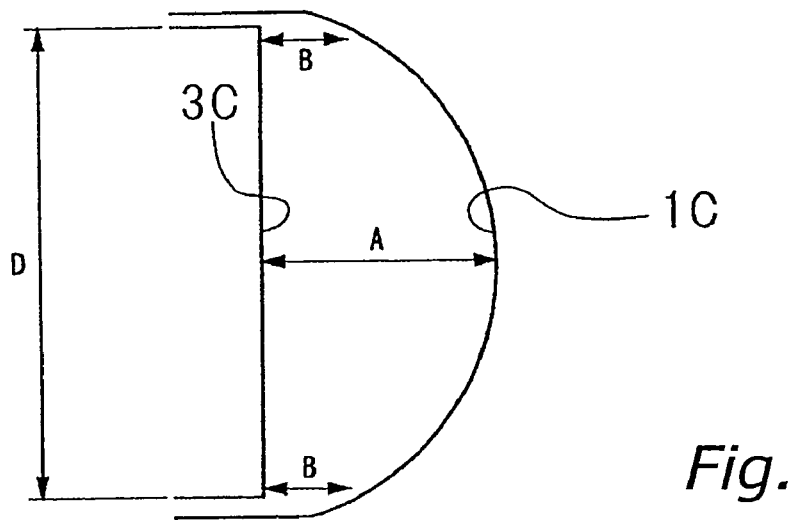
FIG. 4 is an enlarged view of circle Q indicated in FIG. 2 and is a cross sectional view showing a surface shape of a step portion 1C of a sleeve which opposes an outer peripheral surface 3C of the flange.
Figure 4B:
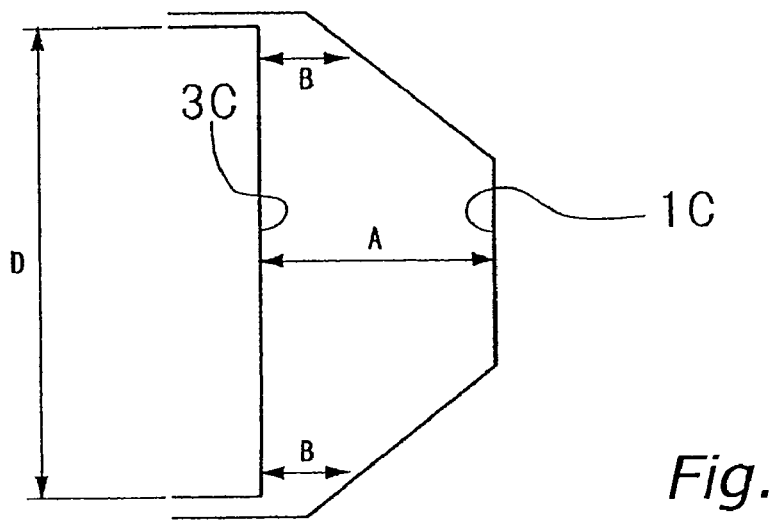
Figure 4C:
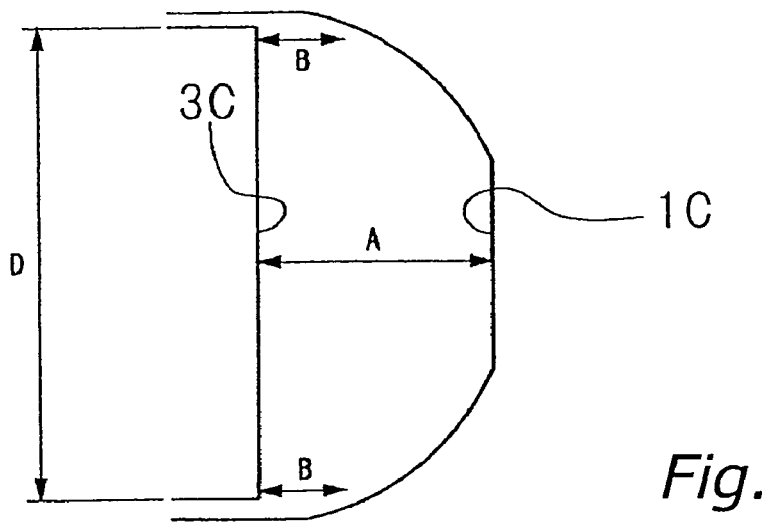

FIG. 4 is an enlarged view of circle Q indicated by broken lines in FIG. 2. In the step portion 1C of the sleeve 1, a line of intersection of a surface which opposes the outer peripheral surface 3C of the flange 3 and a plane including the central axis of the sleeve 1 is preferably a true circular arc or an elliptic circular arc (see FIG. 4A). Alternatively, the surface of the step portion 1C may include a plane inclined with respect to the axial direction of the sleeve 1. The inclined plane may be a flat plane or a curved plane (see FIGS. 4B and 4C).

A gap between a central portion of the outer peripheral surface 3C of the flange 3 and the surface of the step portion 1C is indicated by A. A gap between the vicinity of upper and lower boundaries of the outer peripheral surface 3C of the flange 3 and the surface of the step portion 1C is indicated by B. A thickness of the flange 3 is indicated by D (see FIGS. 4A through 4C). Preferably, aspect ratio A/D is 1 or lower and ratio B/A is 1/2 or lower. In such a case, a secondary flow of the lubricant is generated with a high efficiency in the gap in the vicinity of the outer peripheral surface 3C of the flange 3 while torque loss due to friction between the outer peripheral surface 3C and the lubricant is being kept low.

Therefore, the lubricant is pumped from the gap near the outer peripheral surface 3C of the flange 3 to the gaps above and below the flange 3. This allows a rapid circulation of the lubricant in particular. Details of the secondary flow of the lubricant will be described later.

When the HDD according to an embodiment of the present invention records/reproduces data to/from the magnetic disc(s) 11, the above-described hydrodynamic bearing device operates as follows.

When a current flows through the stator 9, a magnetic field is generated in a core portion of the stator 9. The magnetic field generated between the stator 9 and the magnet 10 applies a rotational force to the hub 8. This cause the shaft 2, the hub 8, and the magnetic disc(s) 11 to integrally rotate having the shaft 2 as an axis (see FIG. 1).

As the shaft 2 rotates, in the gap between the sleeve 1 and the shaft 2, and the gap between the flange 3 and the step portion 1C of the sleeve 1, and the gap between the flange 3 and the thrust plate 4, the lubricant 5 flows along the rotational direction of the shaft 2 and the flange 3.

Figure 5:
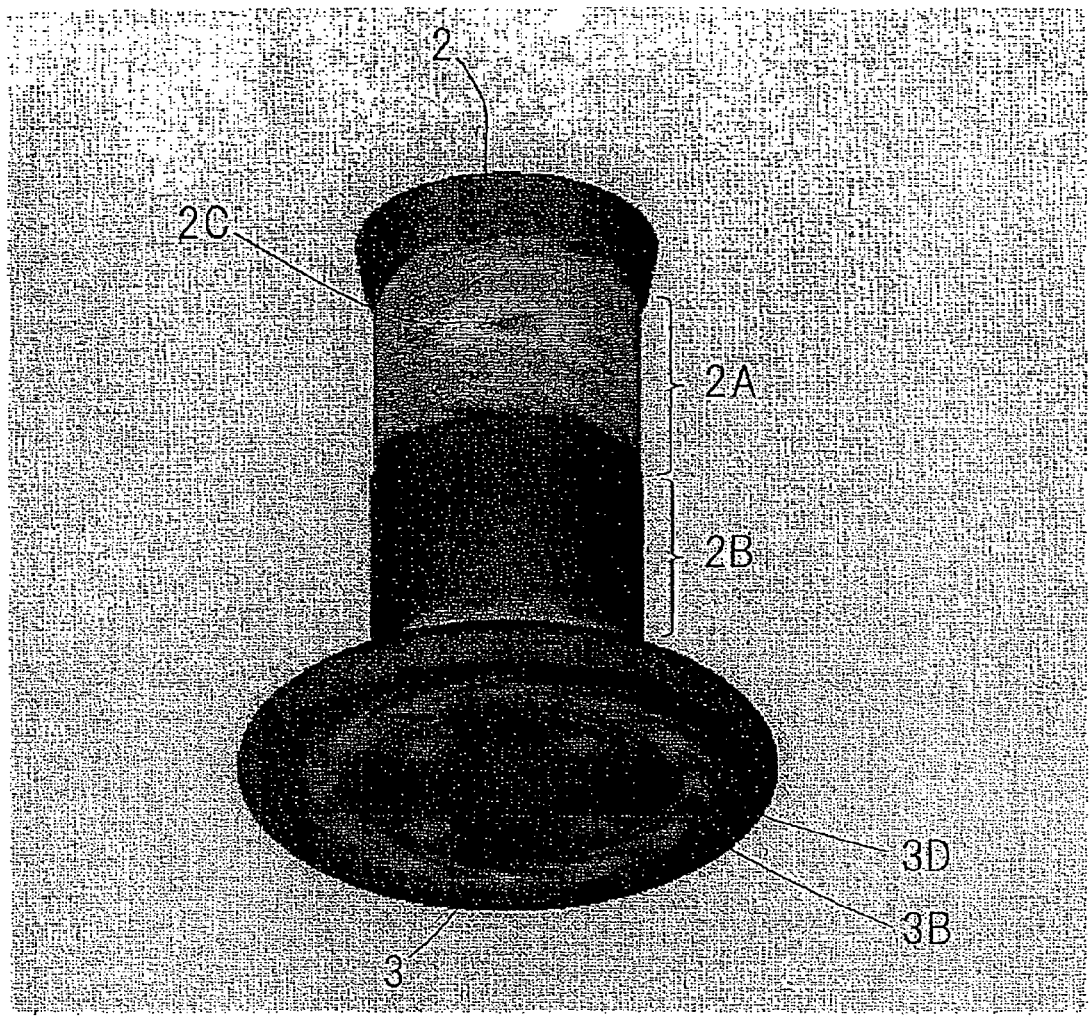
FIG. 5 is a view showing a pressure distribution of a lubricant in the vicinity of surfaces of the shaft 2 and the flange 3 included in a hydrodynamic bearing device according to an embodiment of the present invention.

A pressure distribution of the lubricant 5 in such a case is shown in FIG. 5. In FIG. 5, the magnitude of the pressure is shown by a grayscale.

A first region 2A on a side surface of the shaft 2 shown in FIG. 5 corresponds to the upper radial dynamic pressure generating groove 1A and a second region 2B corresponds to a region between the upper and lower radial dynamic pressure generating grooves 1A and 1B (see FIG. 2). In the first region 2A, the lubricant 5 flows along the radial dynamic pressure generating groove 1A and gathers in the vicinity of inflection points 2C. As a result, the pressure of the lubricant 5 becomes higher as it approaches the inflection points 2C. The same is also true of the vicinity of the lower radial dynamic pressure generating groove 1B. Across the second region 2B, the pressure is lower than that in the first region 2A and approximately uniform.

A high pressure due to pumping actions of the radial dynamic pressure generating grooves 1A and 1B maintains the gap between the sleeve 1 and the shaft 2 stable particularly in a radial direction of the sleeve 1. Therefore, the rotational axis of the magnetic disc(s) 11 does not substantially move in the radial direction.

On a lower surface of the flange 3, the lubricant 5 flows along the thrust dynamic pressure generating groove 3B and gathers in the vicinity of inflection points. As a result, the pressure of the lubricant 5 becomes higher as it approaches the inflection points. For example, on the lower surface of the flange 3 as shown in FIG. 5, the pressure of the lubricant 5 is higher in the vicinity of the thrust dynamic pressure generating groove 3B than in the vicinity of a flat portion between the grooves (hereinafter, referred to as land) 3D (see FIG. 3). The same is also true of in the vicinity of the thrust dynamic pressure generating groove 3A on an upper surface of the flange 3.

A high pressure due to pumping actions of the thrust dynamic pressure generating grooves 3A and 3B keeps the gap between the upper surface of the flange 3 and the sleeve 1, and the gap between the lower surface of the flange 3 and the thrust plate 4 stable particularly in an axial direction of the sleeve 1 (see FIG. 2). Therefore, the rotational axis of the magnetic disc(s) 11 does not substantially tilt from the axial direction of the sleeve 1. Further, the shaft 2 is not substantially displaced in the axial direction.

In this way, the above-described hydrodynamic bearing device rotates the magnetic disc(s) 11 rapidly with a high precision and a stable manner.

During rapid rotation of the magnetic disc(s) 11, the rotation arms 15 rotate having the support 14 as the axis, and move the heads 17 to targeted areas on the magnetic disc(s) 11 (see FIG. 1). The heads 17 are lifted slightly from the surfaces of the magnetic disc(s) 11 due to rapid rotation of the magnetic disc(s) 11. The heads 17 write data to the magnetic disc(s) 11 or read data from the magnetic disc(s) 11 in the targeted areas on the magnetic disc(s) 11. Since the above-described hydrodynamic bearing device maintains the rapid rotation of the magnetic disc(s) 11 with a high precision and a stable manner, the reading and writing data by the heads 17 is highly reliable.

When the shaft 2 is rotated, in the lubricant 5 filled between the gap near the outer peripheral surface 3C of the flange 3, a main flow along the rotational direction of the shaft 2 is generated, and a secondary flow orthogonal to the main flow is also generated.

Distributions of rates of the above-mentioned secondary flow for a plane fixed to the shaft 2 (which includes the rotational axis of the shaft 2 and rotates with the shaft 2) are shown in FIGS. 6A, 6B, 7A, 7B, 8A, 8B, 9A, 9B, 10A, 10B, 11A, and 11B. In these figures, arrows respectively indicate the rate of the flow at its start point (the length and the direction of an arrow respectively represent the rate and the direction of the flow). Further, distributions of pressures of the lubricant 5 for the above-mentioned plane are shown in FIGS. 6C, 6D, 7C, 7D, 8C, 8D, 9C, 9D, 10C, 10D, 11C, and 11D. In these figures, the magnitude of the pressure is shown with a grayscale (the darker the color is, the higher the pressure is).

The results shown in FIGS. 6A through 11D are obtained by numerical simulation using a finite element method.

FIGS. 6A, 6C, 7A, 7C, 8A, 8C, 9A, 9C, 10A, 10C, 11A, and 11C show flow rate/pressure distributions in the case where the surface of the step portion 1C of the sleeve 1 is a flat plane as in conventional examples. FIGS. 6B, 6D, 7B, 7D, 8B, 8D, 9B, 9D, 10B, 10D, 10B, and 11D show flow rate/pressure distributions in the case where the surface of the step portion 1C of the sleeve 1 is a curved plane according to the present invention (particularly an ellipsoidal surface coaxial with the sleeve 1). In other words, in FIGS. 6A, 6C, 7A, 7C, 8A, 8C, 9A, 9C, 10A, 10C, 11A, and 1C, the gap between the outer peripheral surface 3C of the flange 3 and the surface of the step portion 1C of the sleeve 1 in the radial direction is uniform. On the other hand, in FIGS. 6B, 6D, 7B, 7D, 8B, 8D, 9B, 9D, 10B, 10D, 11B, and 11D, gap B near the boundaries of the outer peripheral surface 3C of the flange 3 is narrower than gap A near the central portion of the outer peripheral surface 3C, i.e., B<A. In FIGS. 6A through 11D, ratio B/A is set to a fixed value, $\frac{1}{5}$, as an example.

In FIGS. 6A through 7D, the aspect ratio A/D is 0.2. In FIGS. 8A through 9D, the aspect ratio A/D is 0.5. In FIGS. 10A through 11D, the aspect ratio A/D is 1 (D indicates the thickness of the flange 3).

FIGS. 6A through 6D, 8A through 8D, and 10A through 10D include lands 3D at the outermost peripheral portion of the flange 3. FIGS. 7A through 7D, 9A through 9D, and 11A through 11D include the thrust dynamic pressure generating grooves 3A and 3B in the outermost peripheral portion of the flange 3 (see FIG. 3).

On the planes shown in FIGS. 6A through 11D, the above-mentioned secondary flow is two eddies. The flow of each of the eddies heads from the upper or lower boundary to the center in the vicinity of the outer peripheral surface 3C of the flange 3. The flow of the eddies collapses each other in the vicinity of the center of the outer peripheral surface 3C and moves away from the outer peripheral surface 3C. The flow moved away from the outer peripheral surface 3C is separated into an upward flow and a downward flow in the vicinity of the surface of the step portion 1C of the sleeve 1, and respectively returns to the vicinity of the upper or lower boundary of the outer peripheral surface 3C along the surface of the step portion 1C.

In the case where the surface of the step portion 1C of the sleeve 1 is a flat plane, the flow rate of the eddies is relatively low particularly in the vicinity of the upper and lower boundaries (see circles E shown in FIGS. 6A, 7A, 8A, 9A, 10A, and 11A). In contrast, in the case where the surface of the step portion 1C of the sleeve 1 is a curved surface according to the present invention, a flow rate of the above-mentioned eddies is high in general in the vicinity of the surface of the step portion 1C (see FIGS. 6B, 7B, 8B, 9B, 10B, and 11B). This can also be seen from the fact the surface of the step portion 1C of the curved plane includes more areas of relatively low pressure in the vicinity of the upper and lower boundaries compared to the surface of the step portion 1C of a flat plane (see FIGS. 6C and 6D, 7C and 7D, 8C and 8D, 9C and 9D, 10C and 10D, and 11C and 11D).

Figure 6A:
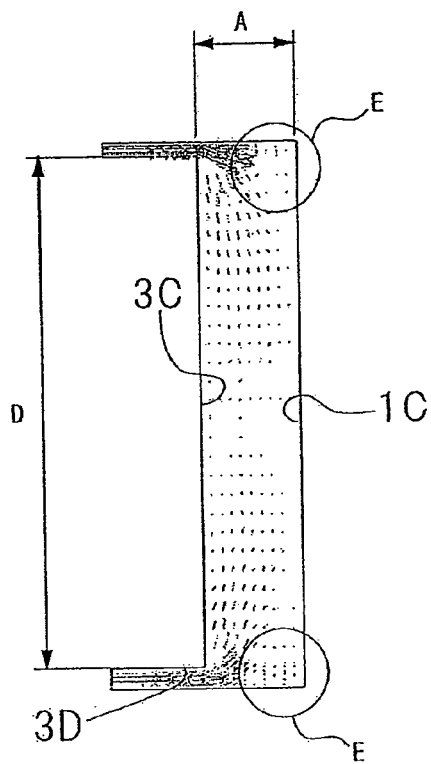
FIGS. 6A through 6D are diagrams showing flow rate/pressure distributions of a lubricant in the vicinity of a land 3D at the outermost peripheral portion of the flange in a gap between the outer peripheral surface 3C of the flange and the step portion 1C of the sleeve (aspect ratio A/D=0.2).
Figure 6B:
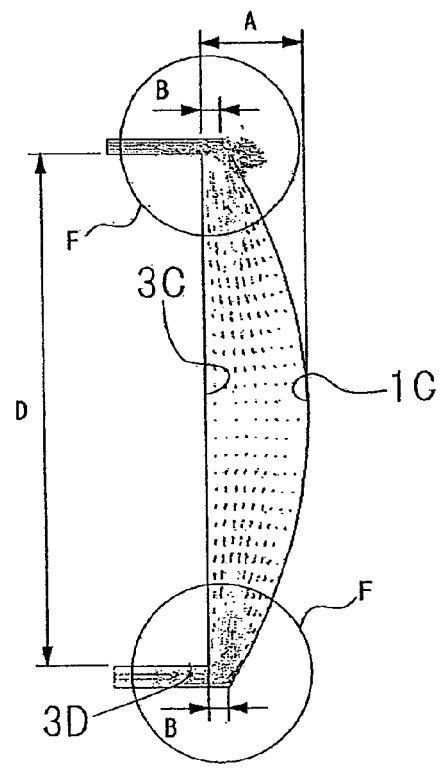
Figure 6C:
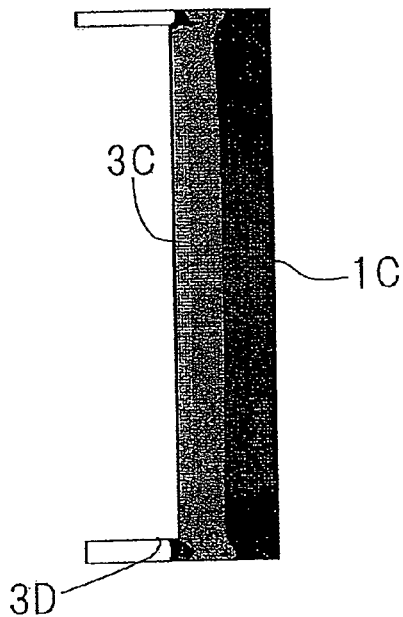
Figure 6D:
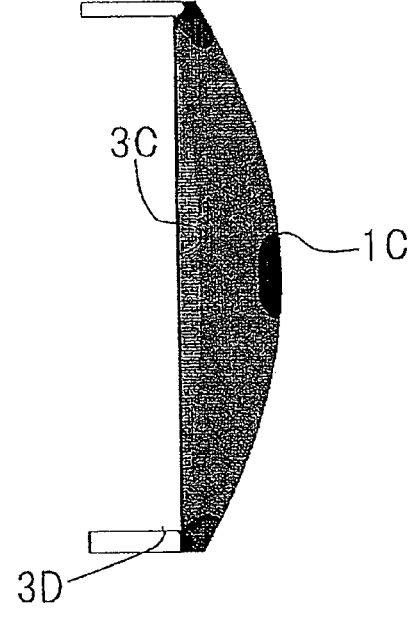
Figure 8A:
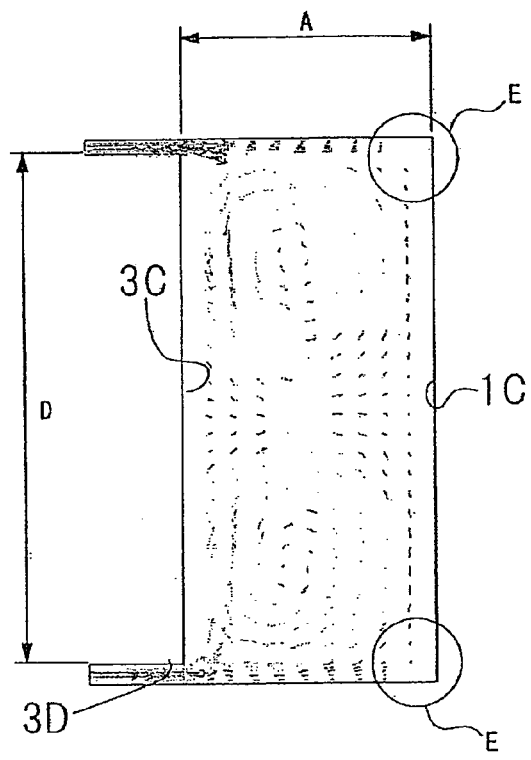
FIGS. 8A through 8D are diagrams showing flow rate/pressure distributions of the lubricant in the vicinity of the land 3D at the outermost peripheral portion of the flange in the gap between the outer peripheral surface 3C of the flange and the step portion 1C of the sleeve (aspect ratio A/D=0.5).
Figure 8B:
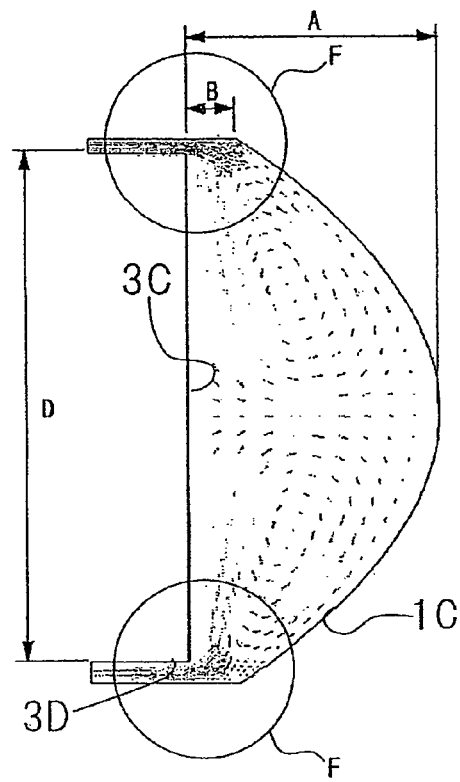
Figure 8C:
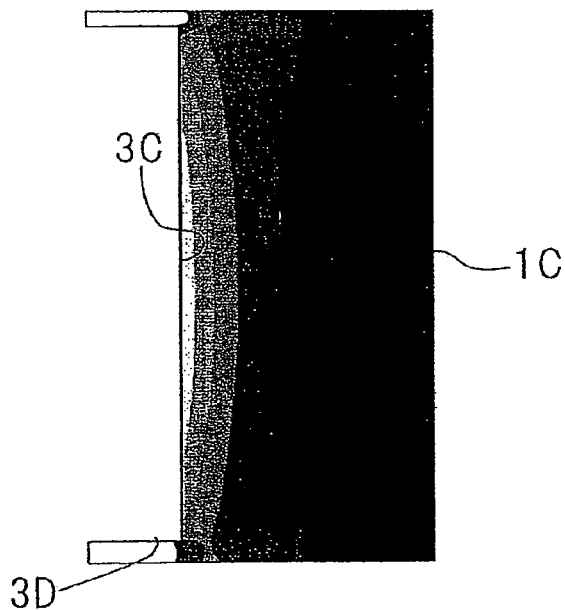
Figure 8D:
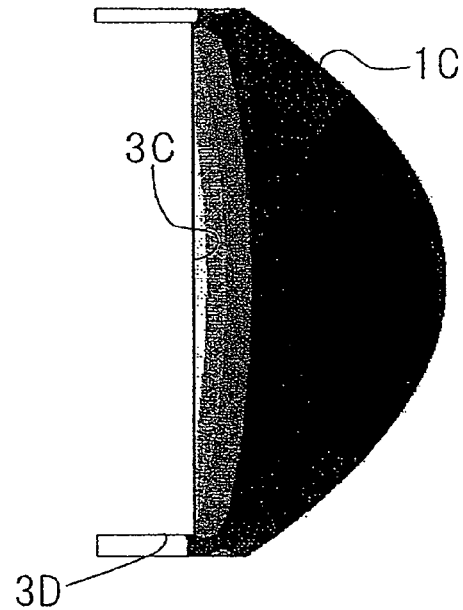
Figures 11A, 11B:
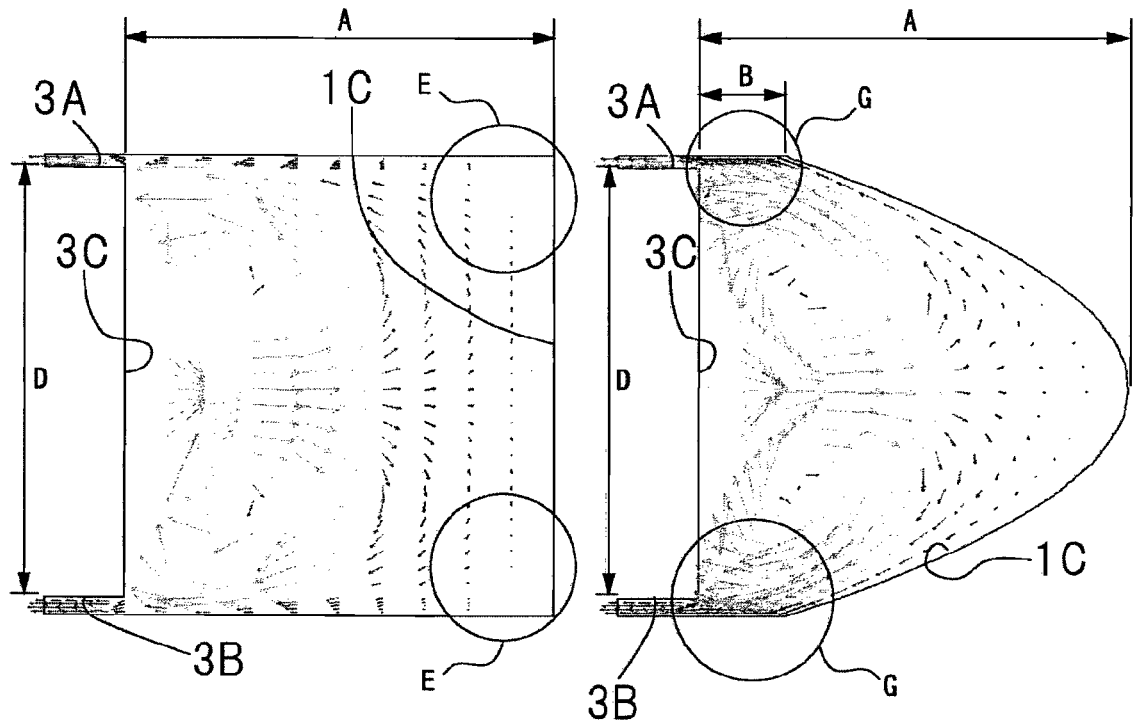
FIGS. 11A through 11D are diagrams showing flow rate/pressure distributions of the lubricant in the vicinity of the thrust dynamic pressure generating grooves 3A and 3B at the outermost peripheral portion of the flange in the gap between the outer peripheral surface 3C of the flange and the step portion 1C of the sleeve (aspect ratio A/D=1).
Figures 11C, 11D:
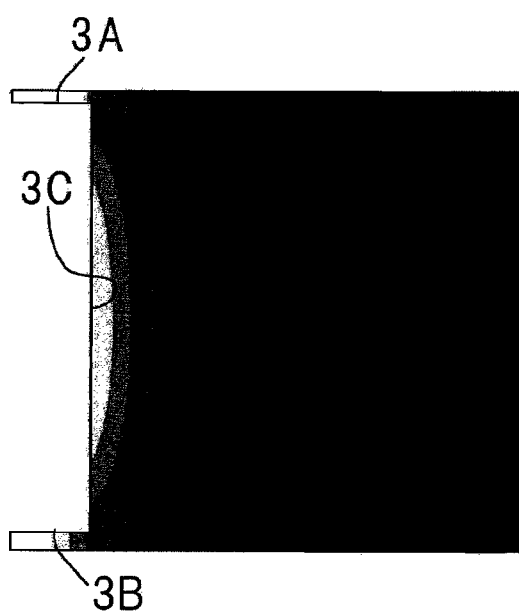
Figure 12:
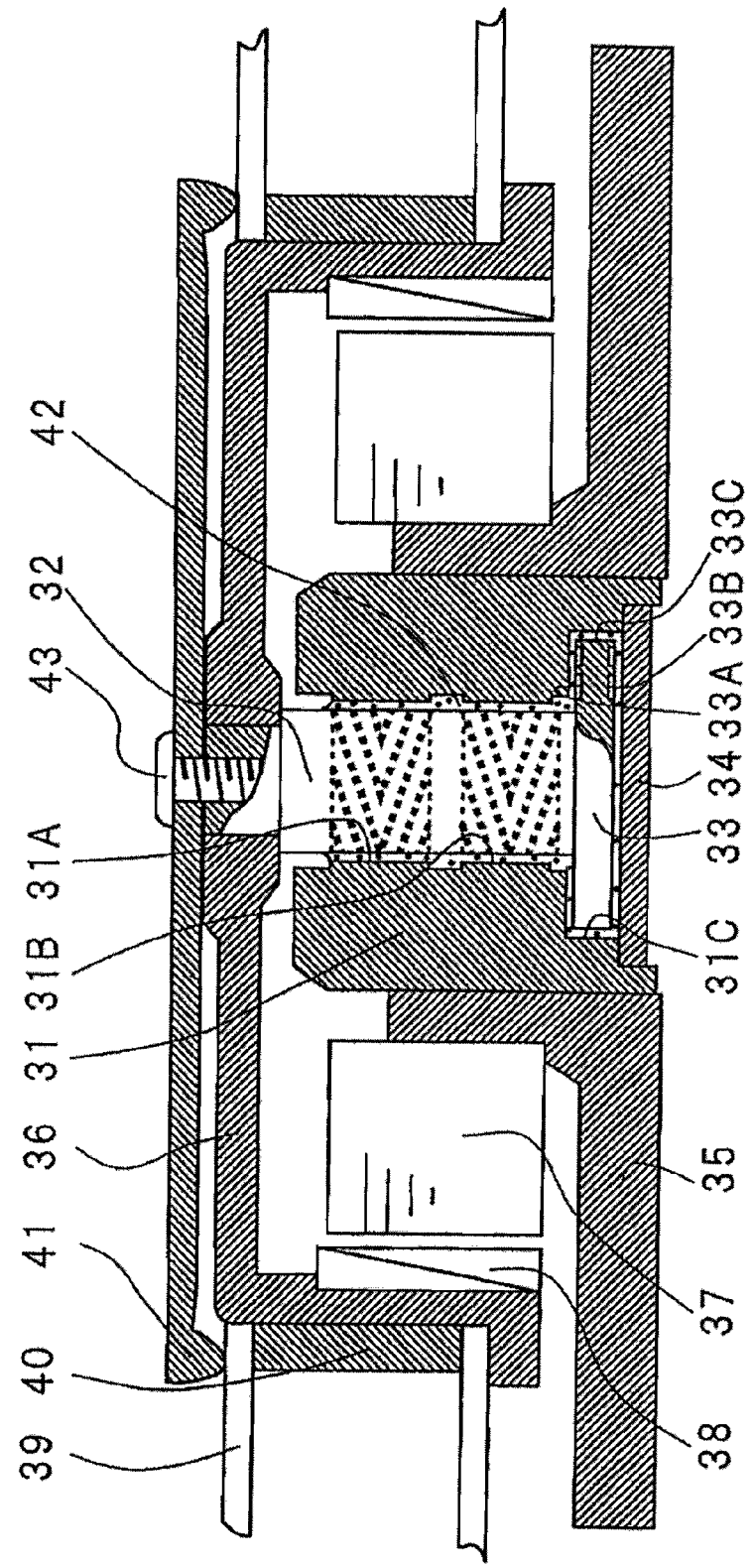
FIG. 12 is a partial cross sectional view of an HDD showing a conventional hydrodynamic bearing device mounted on the HDD.
Figure 13:
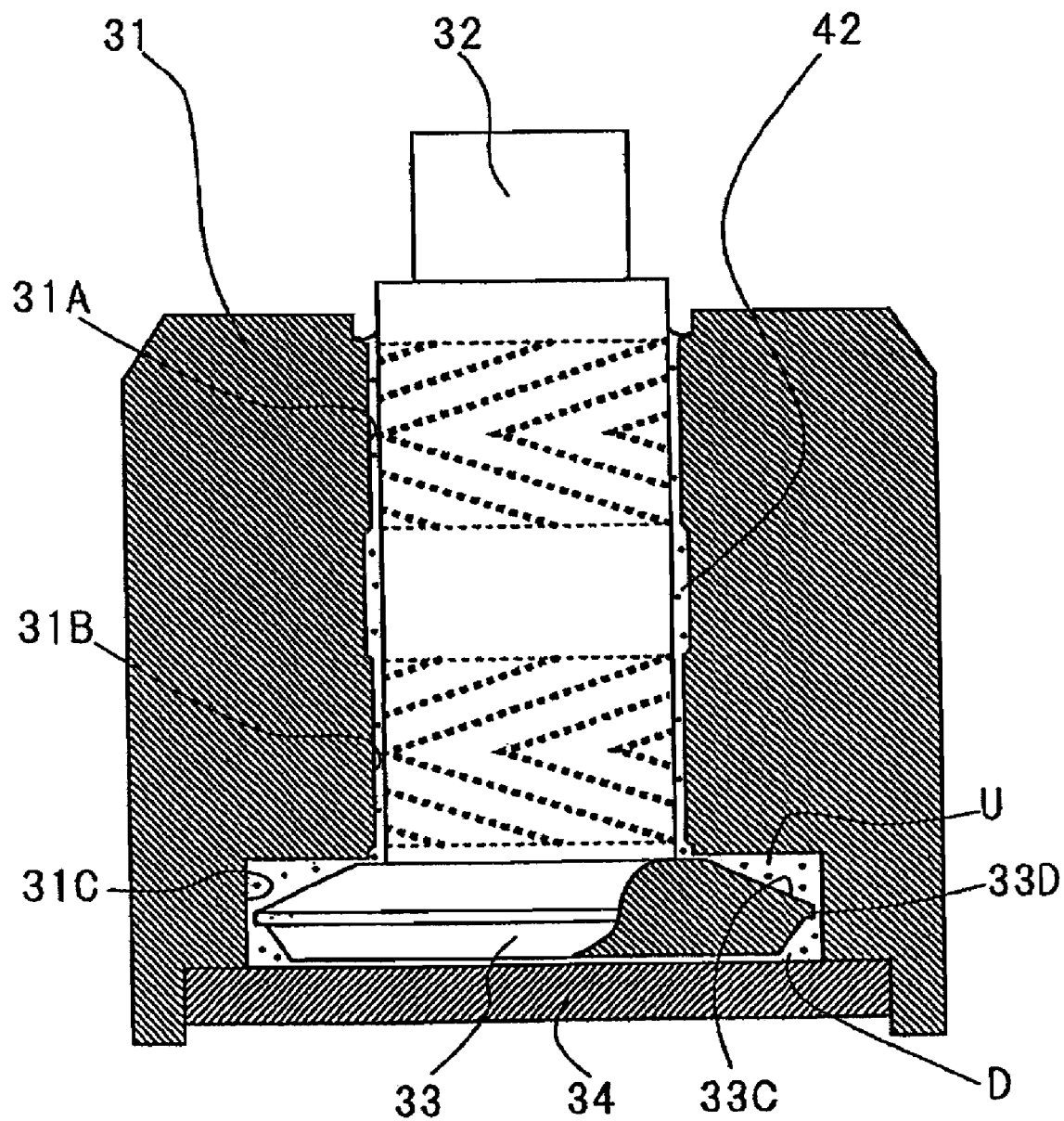
FIG. 13 is a cross sectional view showing a conventional hydrodynamic bearing device including a protrusion 33D in a central portion of an outer peripheral surface 33C of a flange 33.

In FIGS. 6A through 6D, 8A through 8D, and 10A through 10D, the lubricant 5 is blown out from the vicinity of the lands 3D on the upper and lower surfaces of the flange 3 to the vicinity of the outer peripheral surface 3C (see circles F shown in FIGS. 6B, 8B, and 10B). Oppositely, in FIGS. 7A through 7D, 9A through 9D, and 11A through 11D, the lubricant 5 is drawn into the thrust dynamic pressure generating grooves 3A and 3B on upper and lower surfaces from the vicinity of the outer peripheral surface 3C of the flange 3. Particularly, in the case where the surface of the step portion 1C of the sleeve 1 has a shape according to the present invention, the flow rate of the lubricant 5 drawn into the thrust dynamic pressure generating grooves 3A and 3B is high (see circles G shown in FIGS. 7B, 9B, and 11B). In other words, the lubricant 5 is pumped with a high efficiency from the gap near the outer peripheral surface 3C of the flange 3 to the gaps above and below the gap.

As a result, the circulation of the lubricant 5 along the thrust dynamic pressure generating grooves 3A and 3B is fast. Therefore, a period of time necessary for the pressure of the lubricant 5 to be sufficiently raised in the gaps above and below the flange 3 after the flange 3 (accordingly, the shaft 2) started to rotate is short. For example, comparison using simulation shown in FIGS. 6A through 11D shows that a period of time from the start of shaft rotation to achievement of stable rotation can be reduced by about 30%.

As described above, a period of time from the start of the rotation to stabilization required by the above-described spindle motor is short. Therefore, in the above-described HDDs, the rotation efficiency of the discs is high and startup from the halting state or standby state is fast. In addition, the durability is also high.

The hydrodynamic bearing device according to the present invention has a curved plane as described above as a part of the inner surface of the sleeve, thereby accelerating the circulation of the lubricant and reducing a period of time from the start of disc rotation to stabilization. It is clear that the present invention is industrially applicable.

What is claimed is:

1. A hydrodynamic bearing device comprising:
   a shaft;
   a flange which has a shape which is substantially disc shape and is fixed to one end of the shaft;
   a sleeve having the shaft and the flange inserted into a space defined by an inner surface with a predetermine gap being placed between the shaft and the flange and the inner surface, the sleeve having an inner surface portion which opposes an outer peripheral surface of the flange which has an inner diameter smaller in end portions in an axial direction than in a central portion;
   a thrust plate which closes an opening end of the sleeve and which is opposed to the flange; and
   a lubricant filled in a gap between the shaft and the sleeve, a gap between the flange and the sleeve, and a gap between the flange and the thrust plate,
   wherein the inner surface portion of the sleeve which opposes the outer peripheral surface of the flange forms a true circular arc or elliptic circular arc along the axial direction.

2. A hydrodynamic bearing device according to claim 1, wherein a thrust dynamic pressure generating groove is provided on at least one of a circular surface of the flange, the inner surface of the sleeve which opposes the circular surface, and a surface of the thrust plate.

3. A spindle motor comprising:
   a hydrodynamic bearing device including
   (i) a sleeve having an interior space, the interior space being defined by an inner surface of the sleeve,
   (ii) a shaft disposed in the interior space of the sleeve,
   (iii) a flange fixed to one end of the shaft, the flange being substantially disc-shaped and having an outer peripheral surface, and
   (iv) a thrust plate which closes an opening end of the sleeve, the thrust plate being opposed to the flange,
      wherein the flange is disposed in the interior space of the sleeve such that a gap is provided between the outer peripheral surface of the flange and an inner surface portion of the sleeve, the inner surface portion being opposed to the flange and extending in an axial direction of the sleeve from a first end to a second end thereof,
   wherein an inner diameter of the inner surface portion is greater at a central portion of the inner surface portion than at each of the first and second ends of the inner surface portion,
      wherein a lubricant is disposed in a gap between the shaft and the sleeve, the gap between the flange and the sleeve, and a gap between the flange and the thrust plate, and
      wherein the inner surface portion of the sleeve which opposes the outer peripheral surface of the flange forms a true circular arc or elliptic circular arc along the axial direction;
   a hub which is coaxially integral with one of the shaft and the sleeve of the hydrodynamic bearing device;
   a base for fixing the other of the shaft and the sleeve;
   a magnet provided on the hub; and
   a stator provided on the base so as to oppose the magnet.

4. A disc recording and reproducing apparatus comprising:
   a hydrodynamic bearing device including
   (i) a sleeve having an interior space, the interior space being defined by an inner surface of the sleeve,
   (ii) a shaft disposed in the interior space of the sleeve,
   (iii) a flange fixed to one end of the shaft, the flange being substantially disc-shaped and having an outer peripheral surface, and
   (iv) a thrust plate which closes an opening end of the sleeve, the thrust plate being opposed to the flange,
      wherein the flange is disposed in the interior space of the sleeve such that a gap is provided between the outer peripheral surface of the flange and an inner surface portion of the sleeve, the inner surface portion being opposed to the flange and extending in an axial direction of the sleeve from a first end to a second end thereof,
   wherein an inner diameter of the inner surface portion is greater at a central portion of the inner surface portion than at each of the first end second ends of the inner surface portion,
      wherein a lubricant is disposed in a gap between the shaft and the sleeve, the gap between the flange and the sleeve, and a gap between the flange and the thrust plate, and wherein the inner surface portion of the sleeve which opposes the outer peripheral surface of the flange forms a true circular arc or elliptic circular arc along the axial direction;
a hub which is coaxially integral with one of the shaft and the sleeve of the hydrodynamic bearing device;
a base for fixing the other of the shaft and the sleeve;
a magnet provided on the hub;
a stator provided on the base so as to oppose the magnet;
a disc-shaped recording medium disposed coaxially with the hub; and
a head for recording a signal to the disc type recording medium and reproducing a signal from the disc-shaped recording medium when a magnetic field generated between the magnet and the stator applies a rotational force to the hub and the disc-shaped recording medium to rotate.

5. A hydrodynamic bearing device comprising:
a sleeve having an interior space, the interior space being defined by an inner surface of the sleeve;
a shaft disposed in the interior space of the sleeve;
a flange fixed to one end of the shaft, the flange being substantially disc-shaped and having an outer peripheral surface; and
a thrust plate which closes an opening end of the sleeve, the thrust plate being opposed to the flange,
wherein the flange is disposed in the interior space of the sleeve such that a gap is provided between the outer peripheral surface of the flange and an inner surface portion of the sleeve, the inner surface portion being opposed to the flange and extending in an axial direction of the sleeve from a first end to a second end thereof
wherein an inner diameter of the inner surface portion is greater at a central portion of the inner surface portion than at each of the first and second ends of the inner surface portion,
wherein a lubricant is disposed in a gap between the shaft and the sleeve, the gap between the flange and the sleeve, and a gap between the flange and the thrust plate, and
wherein the inner surface portion of the sleeve which opposes the outer peripheral surface of the flange forms a true circular arc or elliptic circular arc along the axial direction.

6. A hydrodynamic bearing device comprising:
a sleeve having an interior space, the interior space being defined by an inner surface of the sleeve;
a shaft disposed in the interior space of the sleeve;
a flange fixed to one end of the shaft, the flange being substantially disc-shaped and having an outer peripheral surface; and
a thrust plate which closes an opening end of the sleeve, the thrust plate being opposed to the flange,
wherein the flange is disposed in the interior space of the sleeve such that a gap is provided between the outer peripheral surface of the flange and an inner surface portion of the sleeve, the inner surface portion being opposed to the flange and extending in an axial direction of the sleeve from a first end to a second end thereof
wherein an inner diameter of the inner surface portion is greater at a central portion of the inner surface portion than at each of the first and second ends of the inner surface portion,
wherein a lubricant is disposed in a gap between the shaft and the sleeve, the gap between the flange and the sleeve, and a gap between the flange and the thrust plate, and
wherein the inner surface portion of the sleeve which opposes the outer peripheral surface of the flange includes a plane inclined with respect to the axial direction.

* * * * *